United States Patent [19]

Schütt

[11] 4,365,461

[45] Dec. 28, 1982

[54] IMPLEMENT FOR THE HARVESTING OF SEED-PRODUCING PLANTS BY MECHANICAL HARVESTER

[75] Inventor: Jürgen M. Schütt, Caracas, Venezuela

[73] Assignee: Instituto Venezolano de Investigaciones Cientificas (IVIC), Estado Miranda, Venezuela

[21] Appl. No.: 202,231

[22] Filed: Oct. 30, 1980

[51] Int. Cl.³ .......................................... A01D 14/02
[52] U.S. Cl. .................................... 56/14.3; 56/17.3; 56/130
[58] Field of Search ................... 56/130, 14.3, 14.5, 56/17.3, 14.4, 14.6, 94, 98, 99, 100

[56] References Cited

U.S. PATENT DOCUMENTS

| | | | |
|---|---|---|---|
| 2,894,364 | 7/1959 | Ehler | 56/14.3 |
| 2,903,836 | 9/1959 | Sheets | 56/14.3 |
| 3,075,339 | 1/1963 | Barkstrom | 56/14.3 |
| 3,448,564 | 6/1969 | Chauffe | 56/14.3 |

*Primary Examiner*—Robert A. Hafer
*Attorney, Agent, or Firm*—Karl F. Ross

[57] ABSTRACT

There is described an implement for the harvesting of seed-producing plants which is suitable for use with mechanical harvesters and is formed of a chassis which comprises basically a hollow front transverse beam and a structure defined by lateral, base and rear parts and a structure which includes a mesh-covered portion; at least two quill-defining trays arranged at an angle with respect to the horizontal, one alongside the other and with their quills pointing in the direction of advance, they being directly connected in front of the front beam; defining between said trays at least one access passage to a cutting station; a cutting station at the end of each passage and arranged slightly to the rear of the trays on the front beam; on which there is provided a high-speed cutting disk which partially overlaps the respective passage; there being provided, in the vicinity of each cutting station and also borne by the front beam a stalk-impelling mechanism adapted to bring, by impeller elements arranged to move over a path which at least partially follows the said passage and partially overlaps the cutting disk of the respective cutting section the plants which are to be cut in order to prevent their suffering undesirable jolts when entering into contact with the cutting disks; a conveyor mechanism adapted to bring the cut plants from the respective cutting station to the inside of the body of the harvester; and transmission means adapted to individually and separately drive the cutting disk of each cutting station at a high, constant and uniform speed for all the disks involved on the one hand and the stalk drive mechanism on the other hand at a speed which is a function of the speed of advance of the harvester so that the relative speed of the drive elements is as close as possible to the speed of advance; said transmission means being received at least partially within the hollow front transverse beam.

6 Claims, 6 Drawing Figures

IMPLEMENT FOR THE HARVESTING OF SEED-PRODUCING PLANTS BY MECHANICAL HARVESTER

BACKGROUND OF THE INVENTION

1. Field of the Invention

The present invention refers to apparatus for agricultural use. More particularly, it refers to an implement for the harvesting of seed-producing plants which is adapted to be connected to a mechanical harvester.

2. Prior Art

Certain seed-producing plants are difficult to harvest with mechanical harvesters because the seeds are produced either in spikes or in capsules and when they are ripe they are so weakly connected to the stalk that a relatively slight jarring, such as caused by the sudden contact with the harvester is sufficient to detach the seed. This is particularly true with respect to the sesame plant.

Moreover there is known the importance which this oil-bearing plant has in the edible-oil producing industry, since its yield is substantially greater than that of other oil-bearing plants of the type of peanuts, sunflower, etc. However, despite the excellent yield, its use has not become widely introduced to the extent which would be desirable, due to the above-mentioned difficulty in harvesting it mechanically and because it is necessary to effect its collection by hand, thus increasing its cost of production.

Insofar as known, there are no special implements for harvesting sesame and other seed-producing plants of the same or similar type. Modification of implements for the harvesting of other types of grains has not given the desired results since, on the one hand, the impacts produced on the plants are excessively violent and cause them to lose an extremely high percentage of their seeds and on the other hand no means have been provided to reduce to a minimum the loss of said detached seed, collecting it in its great majority before it can reach the ground and be lost.

Neither the spiked-tooth harvesters, provided with the sharpest blades, nor the disk harvesters as well as edge or sawtooth harvesters have achieved good results. In the first case, the blow itself necessary to effect the saw cut is already sufficiently pronounced and sudden to produce a shaking of substantially greater intensity than that necessary in order to loosen the seed of the sesame. In addition, as a result of this blow, the strong oscillation imparted to the plants has the result that the loss of seeds does not take place in the manner of a simple action of loosening them at the foot of the plant or in its vicinity but has scattering effects which cause the seeds to fly a considerable distance from the plant from which they have been detached. Accordingly, in this type of harvester it is extremely difficult to provide means which can collect the detached seeds. The same effects have been found with cutting disks of the sawtooth type in which the frequency of the blow transmitted to the stalk before being cut is in direct relationship to the number of teeth which have struck against it during the cutting, effecting in this case the beating in the manner of a vibration which, although it does not have as pronounced effects with respect to scattering, does have them with respect to the number of seeds detached.

Another important source of loss of seeds is the fact that in the traditional harvesters the cutting stations are generally preceded by guide devices in the form of spears or the like which protrude forward from the harvester and the purpose of which is to direct the plants toward each of the cutting stations located directly at the end of said spears. Although the effectiveness of this type of device is acceptable for plants which are not capable of losing seeds, in the case of sesame good results are not obtained since an appreciable number of plants strike violently and directly against the spear before being deflected from their position to each of the related cutting stations. This impact, of course, will result in the loss of seeds so that upon arrival at the cutting station the plant will be practically free of seeds, having lost them in the shaking preceding the cutting in front of the spear, first of all, and in front of the cutting device afterwards.

DESCRIPTION OF THE INVENTION

In view of this state of affairs, the present invention makes a significant contribution to the art by providing an implement which is especially designed to harvest or collect seed-producing plants, particularly plants of the type which easily lose their seeds, and can be adapted to any type of harvester for grains or seeds, legumes or the like. The implement of the invention is constituted to provide collection tray devices arranged so as to project forward from the harvester, formed in such a manner as to provide the maximum possible collection surface, the surface being inclined towards the harvester in order to facilitate the displacement of the seeds recovered by said collection surface; these tray devices are formed in such a manner that they also define between each other narrow passages bordered and preceded by guide edges, on each of which passages there is provided a cutting station provided with a disk-shaped cutter with an edge of sawteeth; with each cutting station there is associated a plant-impelling mechanism intended to carry the plant gently along and bring it in constant and continuous movement to the cutting station, preventing its "rebound," the impelling of said plant continuing beyond the cutting station; and an individual drive mechanism for the cutter disks, adapted to turn them at high speed and another individual drive member for the plant-impeller mechanisms adapted to move the impeller elements provided in said mechanisms with a relative speed which is as close as possible to the speed of advance of the harvester so as to reduce the risk of shaking and impacts against the plants to be cut to a minimum.

All of the elements and mechanisms which have just been described are supported on a hollow transverse beam within which there extend transversely with respect to the harvester a first common shaft for moving the plurality of cutting elements synchronously, said common shaft being coupled to the first drive mechanism; and a second common shaft for moving the corresponding plurality of plant-impelling mechanisms, coupled to the second drive mechanism in such a manner that each one can move independently.

In addition there is also provided, to the rear of the plurality of cutting stations, a conveyor belt arrangement adapted to receive the cut plants which are impelled beyond the cutting disks by the impelling mechanisms and transfer them to a point where an endless mechanism takes the plants and sends them directly to the inside of the harvester for their further processing;

all in as gentle a manner as possible in order to reduce the loss of seeds to a minimum.

There is furthermore contemplated the provision in the implement of this invention of a series of small plates, trays and deflectors, suitably arranged to support the implement, as well as to close off all possible channels of loss for the seeds loosened from the respective plants. And for those cases in which unforeseen jolts may have the scattering effect mentioned above, generally in a direction backward or towards the sides and upward, the entire upper rear portion and the side rear portions of the implement of the invention are covered by a mesh adapted to retain the seeds which emerge slung in this direction so that it may be said that the complete element is entirely enclosed on all its sides except on the front.

In the first individual drive device, in the same way as the second individual drive device, on the respective shafts which extend within the hollow transverse beam there are provided a plurality of sealed converter boxes within which there are sets of bevel gears; one of said gears in direct functional relationship with the shaft and the other gear arranged to convert the rotation of said shaft to rotation of a shaft perpendicular thereto provided to extend from each box, one of the cutter disks or one of the impelling mechanisms respectively being coupled on each of said perpendicular shafts. Of course, the number of sealed boxes on each shaft will be equal to the number of cutting stations provided in the implement.

The invention teaches the formation of the front guide-collector trays in such a manner that the angle at which each edge of a first tapered portion of each tray extends is critical to obtain the least imposing of force on the plant which it guides to the passage giving access to the cutting station. Said angle must be less than the angle of repose determined by the coefficient of friction of the plant against the metallic edge of the tray. Thus the angle of inclination of the tray towards the rear from the front quill is critical so that on the one hand the speed of the plants as they enter the cutting zone is compensated for in order to avoid cutting the upper end thereof and on the other hand in order to facilitate the sliding of the seeds which have been loosened and have fallen onto the trays, to the conveyor belt.

On its part the said conveyor belt has been formed of belt portions which are transversely connected to each other by connector means which define protuberances which extend radially with respect to the trajectory of the belt; in this way the said protuberances define protruding pushers which assist in bringing both the loose seeds and the cut plants to the worm, since the trajectory of said path extends in an ascending plane towards said worm.

DESCRIPTION OF THE PREFERRED EMBODIMENT OF THE INVENTION

The harvesting implement 10 of the present invention can be coupled to any type of mechanical harvester 12 as a front implement. Generally, the type of harvester with which the implement 10 of this invention is associated is provided with front wheels 14 which may be drive wheels in the case of a self-propelled harvester and rear wheels 14 which are generally steering wheels. A series of mechanisms and apparatus are arranged within the body 18 of the harvester 12 such as, for instance, separators, hullers, seed blowers, stalk expellers and the like. Also generally the clean harvested product is brought out of the harvester 12 through the discharge tube 20 directly to the bagging or to bulk storage. Towards the front part of the harvester 12 there is located the driver's seat as indicated at 22, where there are various steering, speed and operating controls for the different mechanisms and devices of the harvester 12, or coupled to it, for instance, of the transmission to the implement 10 of this invention.

The inside of the harvester 12 is reached by the harvested plants by causing them to pass through the front access tunnel or duct 24 which is optionally provided with means which assist in and facilitate the introduction of the harvested plants into the body 18 for the subsequent processing thereof. Around said tunnel 24 there extends a rear wall 26 of the implement 10 of the present invention, surrounding it completely and thus closing any space which might remain between the implement 10 and the harvester 12 and maintaining within said closed enclosure a worm 28 of the mechanical harvester 12 which is normally provided as conveyor for conveying the harvest to the tunnel 24 and arranged to turn around the transverse horizontal shaft 30 of the harvester 12. The lower part of the tunnel 24 and of the worm 28 is covered by a bottom plate 32 which extends transversely over the entire width of the implement 10, to beyond the shaft 30 of the worm (see FIG. 1A).

Figure 1:
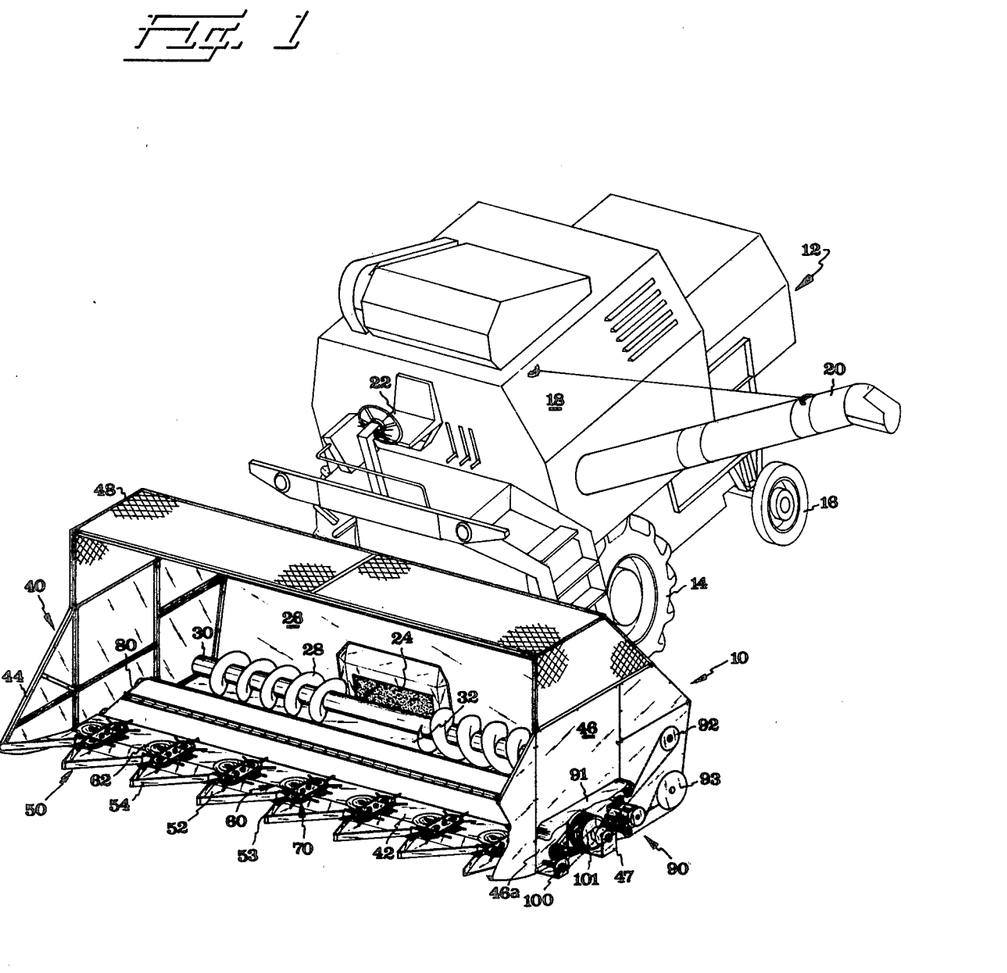
FIG. 1 is a conventional perspective view of the harvesting implement of the present invention, mounted on a mechanical harvester and intended specifically for harvesting sesame.
Figure 1A:
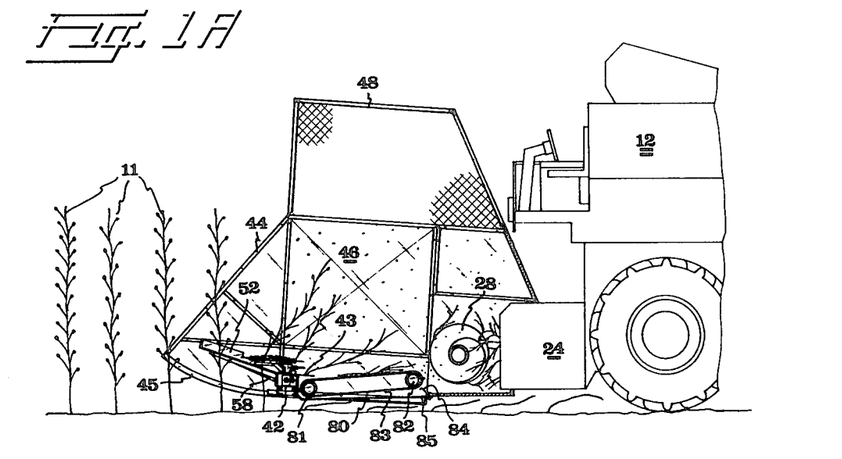
FIG. 1A is a side view, corresponding to FIG. 1, which illustrates somewhat diagrammatically the advance of the sesame plants as they are being cut.

The implement 10 of this invention is composed and developed in the manner shown in FIGS. 1 and 1A. A rigid structure 40 structurally and rigidly forms the body of the implement, serving as support for it. As base of said body there extends a chassis element the main part of which is a hollow transverse beam 42 arranged over the entire width of the implement, serving as base and support for the operating elements of the implement. On said beam 42 there is provided a cover 43 formed of a rigid metal plate arranged to extend rearward and partially overlap a conveyor belt which will be discussed further below. Said cover defines a slight rearward drop which, however, is sufficient to permit the sliding in the direction of the said belt of the objects which fall on it.

Removable wings 44 define lateral frames pinned to each other and to the lower chassis which it supports. The frontmost portions of the side wings 44 define extensions which are curved at the bottom and extend forward, constituting the side quills 45. Said lateral frames are covered by side panels 46. All the lateral frames 44 and the panels 46 are connected in rigid but removable manner to each other and to the end wall 26 which surrounds the tunnel 24. On the frame thus formed there is arranged a mesh 48 which closes off the entire upper space, the side space and the rear space in the manner shown in FIGS. 1 and 1A so as to prevent the loss through this upper space of harvested products which in any way might be thrown in this direction. The same can be said of the walls which enclose the entire inside within which the mechanisms and devices which are now to be described extend.

Arranged along the entire length of the transverse beam 42 are a plurality of front collector trays, generally identified as 50. In FIG. 1 seven complete trays 50 and a half-tray located at each end of the implement have been illustrated.

Each tray 50 is formed of a rigid metal plate of sufficient gauge to be self-supporting, defining a front collecting portion 52 which is tapered towards the front to form the quill 53 (FIG. 4) and the side edges of which extend at an angle of less than 112° to each other. The angle formed between said edges will preferably be about 62°. On said edges there are arranged trays 54 which extend perpendicular to the surface portion 52. As can be better noted from FIG. 4, the opposite edges of two adjacent trays 50 form an intermediate space which decreases in width in the direction away from the quill 53 up to the limit of the angled edges and their respective trays 54. At this point there commences the formation between said trays 50 of a narrow passage 55 of constant width which extends for the entire remaining length of a generally rectangular portion 56 of the collecting surface of the tray and which terminates in connecting flanges with the cover 43 located on the transverse beam 42. The trays 50 have an upward inclination from their origin adjacent the beam 52 towards the quill 53 which is also relatively critical and must be on the order of about 10° to 15°, 12.5° being preferred, with respect to the horizontal.

In order to assist in the rigidity of the tray 50 there is arranged below it a stiffening support 58 which, as can better be noted from FIG. 1A, extends approximately over half the length of said tray 50.

Each one of the narrow passages 55 leads to a cutting station where a cutting mechanism, identified generally as 60, is installed which is formed primarily of a cutting disk 62 which protrudes upward from the transverse beam 42 and is adapted to turn at high speed on a vertical shaft 63 (FIG. 5), supported on anti-friction bearings 64 borne by a hub 65; the lower end of said shaft 63 terminates in a bevel gear and the assembly is firmly supported within the hollow transverse beam 42. Said disk is adapted to overlap the corresponding passage 55.

Figure 4:
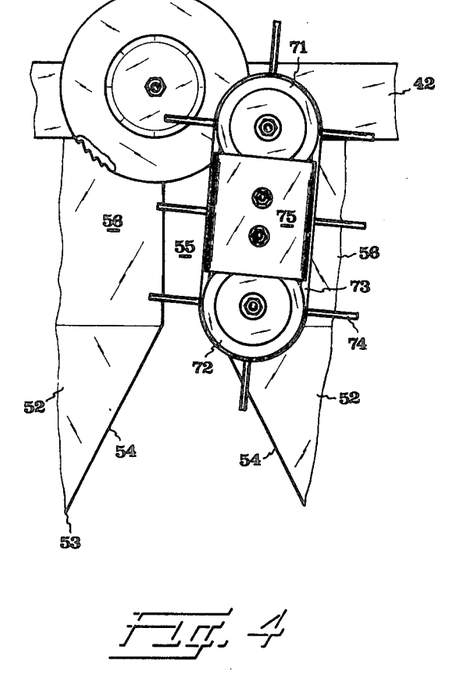
FIG. 4 is a partial top plan view which shows a cutting station and the elements which are immediately around it.
Figure 5:
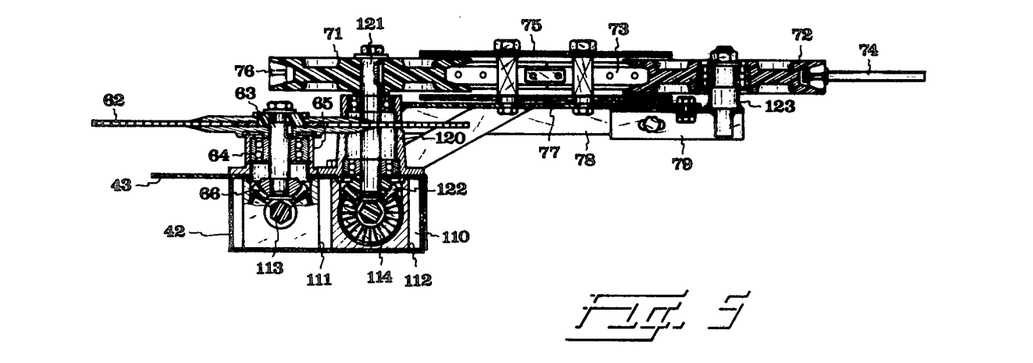
FIG. 5 is a view corresponding to FIG. 4 which shows in vertical longitudinal section the same service station, its connection to the chassis beam and the drive elements directly connected with it.

Immediately adjacent to said cutting station 60 there is arranged a plant-impelling mechanism, indicated generally as 70 in FIG. 1. In FIGS. 4 and 5 said mechanism consists of a first drive pulley 71; a second pulley 72, which is a drive pulley, spaced at an adjustable distance from the pulley 71; the two pulleys being connected to each other by a V-belt 73 which constitutes a generally lengthened circuit between the two pulleys 71, 72. Along said circuit and as said pulley 73 (sic) which bears them is moved driven by the pulley 71, a plurality of bar elements 74 move continuously and pass through the passages 76 provided equally spaced along the entire length of the belt. The center of the circuit thus defined is covered, at the upper part, by a horizontal plate 75 and, at the lower part, by another identical plate 77, the plates being connected firmly to a first supporting member 78 in the form of an elongated angle plate, on the end of which there is provided a second plate 79 of shorter length and similar configuration. The radial axial position of the plate 79 with respect to the plate 78 can be changed in order to adjust the total distance of the two plates. As can be noted from FIG. 5, the second pulley 72 is arranged to rotate on a vertical shaft 123 which is firmly connected with the second plate 79; thus upon adjustment of the relative position thereof with respect to the fixed plate 78, said shaft 123 can change its position with respect to the vertical shaft 121 on which it is arranged in order to turn the first pulley 71, the tension of the belt 73 being thus adjusted. As stated previously, the cutting stations 60, together with their plant impelling mechanisms 70, are arranged on the front cover 43, which extends rearward to overlap the front edge of a conveyor belt 80 which extends along the entire width of the implement 10, as can be noted from FIG. 1. Said belt, as can be noted from FIG. 1A, is arranged so as to extend on a path which ascends slightly towards the rear between two transverse rollers 81 and 82 up to the vicinity of the transverse worm 28. The front roller 81 is a free drive roller while the rear roller 82 is a driven roller. A number of joints of the conveyor belt 80 are arranged along the perimeter thereof, extending transversely as at 83. A deflector 84 is arranged below the rear roller 82, secant thereto, to prevent the materials conveyed towards the rear by the belt 80 from dropping out of position with respect to the worm 28 and the bottom plate 32 of the worm. Another continuous plate 85 is provided below the entire lower course of the conveyor belt 80, so as to prevent damage thereto as a result of any roughness of the land.

Figure 2:
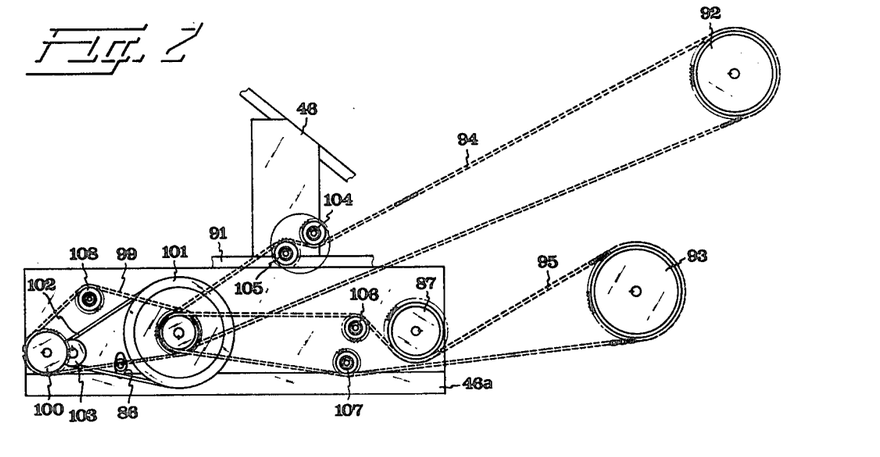
FIG. 2 is a side view in elevation which shows the transmission and drive devices of the present invention.

Referring now to FIG. 2, there can be noted therein the location, on a lateral support 46a extending down from one of the side panels 46, of the rotary shaft 86 for the front roller 81 and the sprocket 87 by means of which there is transmitted to the driven rear roller 82 sufficient torque to move the conveyor belt 80 and the materials arranged on it.

Figure 6:
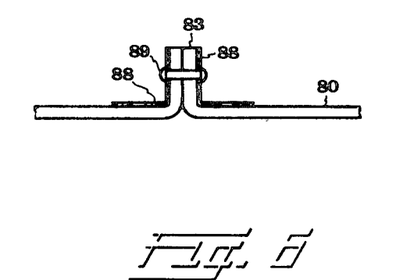
FIG. 6 is a detail view in cross section which shows a joint formed in the conveyor belt.

Said conveyor belt 80, as can be noted from FIG. 6, has each of its joints 83 shaped to constitute pushing protuberances. For this purpose and since the material of which the belt is formed is not sufficiently rigid to extend by itself radially from said belt 80, there is used to form the joint 83 a pair of angle irons 88 arranged mutually opposite each other and held in position, with the intermediate portion of belt by rows of rivets 89 which fasten the two portions of the angle iron 88.

Figure 3:
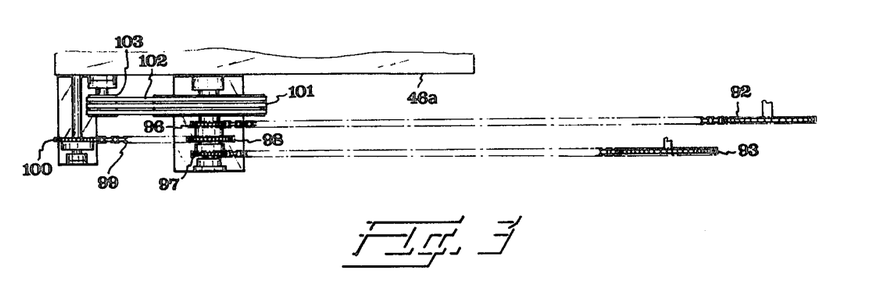
FIG. 3 is a top plan view which illustrates somewhat diagrammatically the transmission portion shown in FIG. 2.

Finally, referring to FIGS. 1, 2 and 3, the drive system for the implement 10, indicated generally as 90, is illustrated, comprising a series of mechanisms housed laterally outside and below the side panel 46 on the outer face of a panel 46a expressly formed for this purpose. The actuating or driving system 90 comprises two independent power take-off points illustrated as sprockets 92, 93 which, by means of suitable independent transmission chains 94, 95, transmit the power from said sprockets 92, 93 to a receiving internal sprocket 96 and a receiving external sprocket 97 respectively. In the manner illustrated in FIG. 1, the diameter of the sprocket 92 is approximately equal to that of the receiving sprocket 96 so that the number of revolutions per minute (rpm) of both sprockets is approximately the same. On the other hand, the diameter of the sprocket 93 in said first embodiment is substantially greater than that of the receiving sprocket 97, so that there is an effect of multiplication of the rpm at which said receiving sprocket 97 turns. In the embodiment shown in FIGS. 2 and 3, there is a multiplying effect for both ratios, but less pronounced than the effect indicated above.

The receiving sprocket 96 is borne by a hollow shaft which is integral with it and also integral with a second sprocket 98 which will be moved in synchronism with the sprocket 96 and at the same speed, and from said sprocket 98 there extends a chain 99 which passes around another sprocket 100 arranged to serve directly the transverse shaft which will move the plant-impelling mechanisms 70, as will be discussed further below.

On its part, the sprocket 97 is firmly connected to a solid shaft adapted to extend coaxially within the said hollow shaft and to turn independently of it. Said shaft extends to beyond the sprocket 96 and is coupled at this end firmly to a multiple pulley 101 of considerably larger diameter than the diameter of the associated sprocket 97 and is connected by a plurality of belts 102 to another multiple pulley 103 whose diameter is several times smaller than the diameter of the pulley 101. In this way there is obtained a second multiplying effect on the multiple pulley 103, which is adapted to serve directly for the transverse shaft which will move the cutting disks of the cutting stations 60, as discussed further below.

The transmission chain 94 between the sprockets 92 and 96 is held in tension by a pair of conjugated gearwheels 104, 105 adapted to alter the orientation of the plane in which their axes of rotation extend in order in this way to lengthen or shorten the path of each chain which passes below the gearwheel 104 and above the conjugated gearwheel 105, or vice versa. On its part, the transmission chain 95 is passed, first of all, over the sprocket 87, adapted as already stated to directly serve the transverse roller 92 of the conveyor belt 80, and immediately thereafter passes around a tensioning gear 106 which establishes a conjugated-pair relationship with the sprocket 87. In the return course the other gear 107 is provided in order to tension said course.

Furthermore, on the chain 99 there is provided a tensioning gear 108 which is triangularly arranged with respect to the sprocket 98 and 100 to which said chain 99 is connected. It should be pointed out here that, as can be noted from FIG. 3, the assembly of shafts firmly connected with the elements 96, 97, 98, 101 is supported for rotation on the support 47, provided for this purpose within the housing 46a, extending down from the side panels 46. The assembly described above is enclosed by a casing 91.

Referring now to FIG. 5, the hollow transverse beam 42 which defines an inner space 110 can be clearly noted therein. Aligned within said space 110, towards its upper part (with reference to the direction of advance), there are a series of sealed boxes 111 the number of which is equal to the number of cutting stations 60 provided in the implement 10 of this invention. Said sealed boxes are arranged directly below each of the cutting disks 62 since from said boxes there protrude the shafts 43 for them. Transversely, each of said boxes has a hexagonal passage through which there is passed a drive shaft 113 of hexagonal cross section, adapted to move a transverse bevel gear 114 which meshes with the bevel gear 66, integral with the vertical shaft 63.

Within the inner space 110 of the hollow transverse beam 42 there is also arranged a series of sealed boxes 112 identical to the sealed boxes 111 and the number of which furthermore is equal to the number of cutting stations 60 provided in the implement 10 of this invention. Said sealed boxes are arranged directly below each of the drive pulleys 71 of the plant-impelling mechanisms 70 located adjacent to each cutting station 60. These boxes also have a hexagonal passage through which is passed an hexagonal drive shaft, identical to the shaft 113 of the boxes 111, adapted to move a transverse bevel gearing 114 which meshes with a bevel gear 122, where there terminates the vertical shaft 121 which moves the pulley 71. As already seen above, the boxes 111 will be moved from the multiplier 101, 102, 103 so that the disks 72 can turn at high speed. In addition, as the power take-off, namely the sprocket 93 for this purpose, receives a constant torque, the high speed of rotation of the disks 62 will remain at all times uniform and unvaried, despite the fact that the harvester increases or decreases its speed of advance. On the other hand, the sprocket 92 receives a torque which is controlled so that the rotation imparted to the sprocket 100 which will actuate the respective transverse shaft can increase or decrease according to the increase or decrease of the speed of advance of the harvester 12. As a result hereof, the speed of rotation of the pulley 71 will also be modified, increasing or decreasing the linear speed at which there move the bar elements 74 which are those which will act to push the plants which are entering the passage 55 from a fair distance before their arrival at it. Since the speed at which the plants reach the passage (and finally the cutting disk 62 installed at the end thereof) will depend on the speed of advance of the harvester 12 and since the linear speed of said rod elements 74 will be as close as possible to that speed, the push which the rods 74 will exert on the plants in order to bring them firmly and without shaking to the cutting disk 62 will be almost imperceptible and will serve somewhat as support so that the plants are not shaken when the high speed of rotation of the disk 62 tends to impart to them the shaking caused by inertia.

In any event, since the cutting station 60 will be substantially inside the structure 40 of the harvesting implement 10, the seeds of the plants 11 which may emerge thrown off from the plants, as can clearly be noted in FIG. 1A, will remain in their majority confined within the enclosure covered by the grid 48, the side panels 46, the end wall 26, the lateral quills 45 and the collecting and guide trays 50, thus reducing to a minimum the number of seeds lost by falling out of the places from which they can be brought to the inside of the harvester.

I claim:

1. An implement for harvesting seed-producing plants suitable for use with a mechanical harvester which comprises:
a chassis, constituted generally as a front hollow transverse beam which extends along the entire width of the implement;
a self-bearing structure, supporting the said chassis, adapted to define a closed contour for the implement except for its front;
at least one pair of collector tray means borne by the transverse beam and adapted to extend, spaced apart from each other, towards the front of the harvester; said tray means being developed to define a large collection surface which extends at an inclination towards the rear of between about 10° and 15°;

static guide means defined on the cooperating edges of the adjacent tray means and spaced apart from each other which define narrow intermediate passage means which have a generally axial course;

a cutting station, provided at the end of each of the intermediate passages, provided with a disk-shaped cutting element adapted to cover the entire width of the end of the associated passage means;

a plant impelling mechanism associated with each cutting station, provided with projecting impelling means adapted to engage the plants and impel them along the associated intermediate passage means and bring the plants firmly and uniformly to beyond the cutting station;

a first drive mechanism for the cutter disks, adapted to cause them to turn at high speeds synchronously;

a second drive mechanism for the plant impelling mechanisms adapted to move said projecting impelling means provided on the said mechanisms at a relative speed of approach to the associated cutter means which is as close as possible to the speed of advance of the harvester; said first and second drive mechanisms extending separately within the front transverse beam of the chassis;

transmission means for connecting the first and second drive mechanisms to the power take-offs of the harvester, and conveyor means arranged to the rear of the cutting stations to bring the cut plants into the harvester; said conveyor means being functionally coupled to the transmission means which moves the second drive mechanism so that its speed is directly related to the speed of the projecting impelling means.

2. An implement for collecting seed-producing plants adapted to be used with a mechanical harvester coupled at its front, which comprises:

a chassis, constituted generally as a hollow front transverse beam which extends along the entire width of the tool and which bears on its upper face a series of pairs of openings corresponding to an equal number of cutting stations;

a self-supporting structure supported by the said chassis, adapted to define a closed contour for the implement except at its front and provided with elements for coupling to the front of the harvester;

a plurality of collector tray means borne by the transverse beam and adapted to extend spaced apart from each other towards the front of the harvester to define a plurality of quills which are spaced equally apart; said tray means being constituted to define furthermore a collecting surface which covers a substantial percentage of the space located in front of the implement and adapted to extend at an inclination towards the rear of between about 10° and 15° with respect to the horizontal;

static guide means defined by the cooperating edges of the adjacent tray means and spaced apart from each other; the edges of each tray converging towards the quill formation point from approximately the center of the length of said tray means in order thus to define a front portion of intermediate passage which tapers towards the bottom and a second rear intermediate passage portion which maintains a minimum width and a generally axial orientation;

a cutting station provided at the end of each of the intermediate passages, provided with a disk-shaped cutting element adapted to turn on a vertical shaft and to cover all of the minimum width of the end of the associated passage means;

a plant-impelling mechanism associated with each cutting station in which there are provided means forming a closed circuit which extends around the vertical shafts, slightly forward and to one side of the associated cutting station, and a plurality of impelling means radially projecting from the circuit means adapted to contact the plants which enter the passage and impel them along same, bringing them firmly and uniformly to beyond the cutting station;

first drive mechanism for the cutter disks adapted to move the vertical shaft of each cutter disk concurrently and impart a high-speed rotation to each of them;

second drive mechanism for the plant-impelling mechanisms adapted to move concurrently one of the vertical shafts of the closed circuit forming means provided on each plant-impelling mechanism at a speed of rotation such that each of the projecting impelling means provided in the closed circuit approaches the associated cutting device at a speed as close as possible to the speed of advance of the harvester;

said first and second drive mechanisms extending separately within the front transverse beam and with a corresponding plurality of gear boxes, arranged so that a vertical shaft protruding from each of them projects upward through each one of the series of corresponding pairs of openings;

transmission means for seating the first and second drive mechanisms to the power take-offs of the harvester; at least one speed multiplier means being provided for one of said transmission means in order to increase the number of revolutions delivered to one of the first and second drive mechanisms; and conveyor means arranged to the rear of the cutting stations to bring the cut plants into the harvester; said conveyor means being functionally coupled to the transmission means which moves the second drive mechanism so that its speed is directly related to the speed of the projecting impeller means.

3. An implement for harvesting seed-producing plants, adapted to be used connected to the front of a mechanical harvester, which comprises:

a chassis constituted generally as a hollow front transverse beam which extends along the entire width of the implement and which on its upper face bears a series of pairs of openings corresponding to an equal number of cutting stations; with the openings of each pair spaced apart at predetermined distances;

a self-supporting structure, supporting the said chassis, formed by a metal frame and a plurality of panels arranged to cover said frame and thus define a contour closed on three of its sides and open on the front; said self-supporting structure being furthermore provided with coupling elements for the front of the harvester and side means supporting transmission means;

a plurality of collecting tray means borne by the transverse beam and adapted to project spaced apart from each other towards the front of the harvester to define a plurality of quills which are equidistant from each other; said tray means being constituted to define, furthermore, a collecting surface which covers a substantial percentage of the space located in front and towards the front of the implement and adapted to extend with an inclination rearward of between about 10° and 15° with respect to the horizontal;

guide means defined by rail means borne by the cooperating edges of the adjacent tray means and spaced apart from each other; said edges and the associated rail means on each tray converging towards the quill formation point from approximately the midpoint of the length of said tray means in order thus to define a front portion of intermediate passage which tapers towards the bottom and a second rear portion of intermediate passage which maintains a minimum width and a generally axial orientation;

a cutting station associated with each of the intermediate passages, provided with a disk-shaped cutter element arranged to protrude from one of the openings of the pair corresponding to the respective cutting station; and adapted to turn on the vertical shaft which passes through said opening and to cover the entire minimum width of the end of the associated passage means so that it follows tangentially said passage end;

a plant-impelling mechanism associated with each cutting station, in which there are provided means forming a closed circuit, consisting of a first pulley adapted to turn around a first vertical shaft, arranged to extend upward from the second opening of the pair of openings corresponding to the associated cutting station; a second pulley, adapted to turn around a second vertical shaft, adjustable in its distance with respect to the first; and a belt which passes around both pulleys to define the closed circuit; a plurality of impelling devices radially projecting from said belt being provided, adapted to move over the closed circuit and pass, on its path, along the entire second portion of the intermediate passage and overlap the associated cutting disk;

first drive mechanism for the cutter disks, adapted to move concurrently the vertical shaft of each cutting disk of the plurality of cutting stations and to impart to each of them a synchronous rotation of high velocity;

second drive mechanism for the first pulley of each plant-impelling mechanism adapted to move concurrently the plurality of vertical shafts corresponding to each first pulley at a synchronous speed of rotation such that each of the projecting impelling devices provided on the belt means moves over the second portion of the intermediate passage, bringing the plants which it bears to same at a speed as close as possible to the speed of advance of the harvester;

said first and second drive mechanisms extending separately within the front transverse beam and with a corresponding plurality of sealed gear boxes provided with transverse passages axially aligned with said front transverse beam and arranged in such a manner that from each gear box there protrudes a vertical shaft which extends upward through each of the series of corresponding pairs of openings;

first transmission means for coupling the first drive mechanism to the power take-off of the harvester; a speed multiplying means being provided in said first transmission means to increase the number of revolutions delivered to the first drive mechanism;

second transmission means for coupling the second drive mechanism to a second power take-off of the harvester; a speed regulating means being provided which is functionally related with the said second transmission means to permit the speed delivered to the second drive mechanism to be a function of the speed of advance of the harvester, and conveyor means arranged to the rear of the cutting stations to bring the cut plants into the harvester; said conveyor means being functionally connected to the second transmission means so that the speed of said conveyor is approximately equal to the speed of translation of the projecting impeller means.

4. An implement for the harvesting of seed-producing plants adapted to be used coupled to the front of a mechanical harvester which comprises:

a chassis, formed generally as a hollow front transverse beam which extends along the entire width of the implement and which on its upper face bears a series of pairs of openings corresponding to an equal number of cutting stations; with the openings of each pair spaced apart at pre-established distances;

a self-supporting structure supporting the said chassis formed by a metal framework and a plurality of panels arranged to cover said framework and thus define a closed contour on three of its sides and open on the front; said self-supporting structure being furthermore provided with a mesh which covers the upper part of the closed contour; there being furthermore provided coupling elements for the front of the harvester and lateral means supporting the transmission means;

a plurality of collector tray means borne by the transverse beam and arranged to extend spaced apart from each other towards the front of the harvester to define a plurality of quills which are equally spaced apart; said tray means being constituted to define furthermore a collection surface which covers a substantial percentage of the area located in front and towards the front of the implement, and adapted to extend with an inclination rearward of between about 10° and 15° with respect to the horizontal;

guide means defined by rail means borne by the cooperating edges of the adjacent tray means and spaced apart from each other; said edges and the associated rail means conveging on each tray towards the quill formation point from approximately the midpoint of the length of said tray means with an angle of between 50° and 55° in order thus to define a front portion of intermediate passage which tapers towards the bottom from the quill; and a second rear portion of intermediate passage formed of parallel edges which maintains a minimum width and a generally axial orientation;

a cutting station associated with each of the intermediate passages, provided with a disk-shaped cutter element arranged to protrude from one of the openings of the pair corresponding to the respective cutting station; and adapted to turn on the vertical shaft which passes through said opening and to cover the entire minimum width of the end of the associated passage means so that it is tangentially secant to said passage end;

a plant-impelling mechanism associated with each cutting station, consisting of a first pulley arranged to rotate in a plane above the plane of the cutter disk around a first vertical shaft, arranged to extend upward from the second opening of the pair of openings corresponding to the associated cutting station; a second pulley adapted to rotate in the same plane as the first pulley around a second vertical shaft adjustable in its distance from the first; a belt which passes around both pulleys to define a closed circuit; means which cover the inner area of said circuit above and below same; and a plurality of elongated impelling means projecting radially on said belt and adapted to move over the closed circuit on said projecting projection and pass on its course along substantially the entire second portion of intermediate passage and overlap the associated cutting disk;

first drive mechanism for the cutting disks in the form of a solid shaft which extends along the entire length of the front transverse beam of the chassis on its inner part adapted to extend through a plurality of sealed gear boxes arranged one for each cutting disk and each provided with an aligned transverse passage, all aligned in a first axial position within said front transverse beam of the chassis;

second drive mechanism for the first pulley of each plant-impelling mechanism, in the form of a solid shaft which extends along the entire front transverse beam of the chassis within it, adapted to extend through a plurality of sealed gear boxes, arranged one for each plant-impelling mechanism, and each provided with an aligned transverse passage, with all the aligned passages in a second axial position within said front transverse beam of the chassis, independent of and parallel to the first axial position;

each of the boxes of the first and second drive mechanisms adapted to transmit the rotation of the horizontal shaft of the respective solid shaft rotatably on the vertical shaft individually for each cutter disk and each first pulley of each cutting station present in the mechanism;

first transmission means to connect the first driving mechanism to the power take-off of the harvester, a speed multiplying device being provided in said first transmission means to increase the number of revolutions delivered to the first drive mechanism;

second transmission means between the second drive mechanism and a second power take-off of the harvester; a speed regulating device functionally related to the second transmission means being provided to cause the speed delivered to the second drive mechanism to be a function of the speed of advance of the harvester; and conveyor means, arranged to the rear of the cutting stations, which extends along the entire width of the implement in order to transport the cut plants and the loose seeds towards the inside of the harvester; provided with a plurality of projecting pushing elements which extend transversely at intervals on said conveyor; and said conveyor means being functionally coupled to the second transmission means in such a manner that the speed of said conveyor is directly related to the speed of translation of the projecting impeller means.

5. An implement for harvesting seed-producing plants, adapted to be used coupled to the front of a mechanical harvester, and particularly intended for harvesting sesame plants, which comprises:

a chassis, formed generally as a hollow front transverse beam which extends along the entire width of the element and which on its upper face bears a cover which extends overhung towards the rear; a series of pairs of openings corresponding to an equal number of cutting stations being formed through the beam and the cover, with the openings aligned in two rows axially parallel to the beam and with separation between the rows;

a self-supporting structure supporting the said chassis, formed by a metal framework and a plurality of panels arranged to cover said framework and thus define a closed contour on three of its sides and open on the front; the upper portion being covered by a mesh and there being provided furthermore coupling elements for the front of the harvester and means supporting the transmission means, provided on the outside on the side panel means;

a plurality of collector tray means, borne by the transverse beam and arranged to be located one alongside of the other at the front of the transverse beam and extending forward as a plurality of quills which are equally spaced apart; said tray means being constituted to define furthermore a collection surface which covers a substantial percentage of the area located in front and towards the front of the implement and adapted to extend with an inclination rearward of between about 10° and 15° downward from the horizontal;

guide means, defined by rail means borne by the opposite edges of the adjacent tray means; the frontmost portion of said edges and of the associated rail means on each tray converge towards the quill formation point with an angle of convergence of between 50° and 55°; and the rear portion of said edges defines a passage of constant minimum width defined by the parallel edges on said portion;

a cutting station associated with each of the passages, provided with a disk-shaped cutter element adapted to turn on a vertical shaft which protrudes from one of the openings of the pair corresponding to the respective cutting station, which are formed on the transverse beam and its associated cover; said disk covering the rear end portion of the associated passage means so that it is tangentially secant to said passage;

a plant-impelling mechanism associated with each cutting station, consisting of a first pulley adapted to rotate in a plane above the plane of the cutting disk of the respective station around a first vertical shaft adapted to protrude upward through the second opening of the pair of openings corresponding to the respective cutting station, formed in the transverse beam and its associated cover; a second pulley arranged to rotate in the same plane as the first pulley around a second vertical shaft adjustable in its distance from the first; a belt which is operatively received on both pulleys in order to drive the second pulley synchronously with the rotation of the first and define an elongated closed circuit which includes both pulleys; upper and lower cover means for said circuit; and a plurality of elongated means which extend radially from said anchorage points provided equally spaced apart on said belt, which are driven by it around the elongated circuit; this impelling mechanism being oriented and arranged in such a manner that the elongated means pass on their course along substantially the entire rear portion of the passage and overlap the associated cutting disk;

first drive mechanism for the cutter disks in the form of a first solid shaft which extends within the front transverse beam of the chassis in registration with the first rows of axially aligned openings mentioned above; there also being provided in registration with each of the openings of said first row a sealed gear box formed with a transverse passage and an integral vertical shaft on which the respective cutter disk is mounted; said solid first shaft passing through all the aligned passages of said sealed box;

second drive mechanism for the first pulley of each plant-impelling mechanism, in the form of a second solid shaft independent of the first solid shaft, which extends from the front transverse beam of the chassis in registration with the second row of axially aligned openings mentioned above; there being provided, also in registration with each of the openings of said second row, a sealed gear box formed with a transverse passage and an integral vertical shaft on which there is mounted the respective first pulley of the corresponding impelling mechanism; said second solid shaft passing through all the aligned passages of said sealed boxes;

first transmission means which functionally couples the first drive mechanism with a first power take-off of the harvester which has an output with a constant torque; a speed multiplying means being provided on said first transmission means to increase the number of revolutions delivered to the first drive mechanism;

second transmission means which functionally couples the second drive mechanism and a second power take-off of the harvester which has a solid with adjustable torque so that the speed delivered to the second drive mechanism is a function of the speed of advance of the harvester; and conveyor means, arranged behind the cutting stations, formed of a continuous belt which extends along the entire width of the implement to transport the sesame plants and the loose seeds to a collecting device borne by the harvester at the front thereof; said conveyor means extending from a position overlapped by the cover of the front transverse beam on its front edge to immediately below said collecting means of the harvester on the rear edge; and the continuous belt being arranged to pass around a first idle transverse roller and a second driven transverse roller; a plurality of push elements being provided projecting radially from said belt, and the second roller being functionally coupled to the second transmission means in such a manner that the speed of said conveyor is directly related to the speed of translation of the lengthened impeller means.

6. An implement for harvesting seed-producing plants, adapted to be used coupled to the front of a mechanical harvester and intended especially for harvesting sesame plants, which comprises:

a chassis, formed generally as a hollow front transverse beam which extends along the entire width of the implement; an upper cover which projects almost horizontally towards the rear;

a self-supporting structure supporting said chassis formed by a metallic framework and a plurality of panels which close, on the sides and the upper part, the contour directly over the element; the upper part being closed by a mesh; supporting means for the transmission means being formed externally on one of the sides;

a plurality of collector tray means formed by the transverse beam and arranged to extend one alongside the other over the entire front of the transverse beam; said tray means defining a collecting surface which is bent at an angle at the end and generally rectangular at the upper part, which covers a substantial percentage of the area located at front and towards the front of the implement; said trays extending towards the front and upward at an angle of inclination of approximately 12.5° with respect to the horizontal;

rail means borne on the edges of the tray means; said edges being formed in such a manner that the angled portion has a front quill with an angle of convergence of about 54°; and the rear portion of the cooperating edges of two adjacent trays forming a linear passage which extends axially until encountering the transverse beam;

a cutting station associated with each of the passages, which station is borne on the hollow transverse beam and provided with a disk-shaped cutter element arranged to rotate on a vertical shaft which protrudes from an opening of a pair of openings provided for each cutting station both on the transverse beam and on its associated cover; said disk covering the extreme end portion of the associated passage in a manner secant to it;

a plant-impelling mechanism associated with each cutting station, consisting of a first pulley arranged to rotate by impulses in a plane above the plane of the cutting disk of the respective station around a first vertical shaft which protrudes upward through the second opening of the pair of openings corresponding to the respective cutting station which are formed in the transverse beam and its associated cover; a second pulley arranged to rotate freely in the same plane as the first around a second vertical shaft which extends upward an adjustable distance with respect to the first; which means permits the adjustment of the second shaft with respect to its distance from the first; a belt received functionally on both pulleys to drive the second pulley in synchronism with the rotation of the first and define an elongated closed circuit which includes both pulleys; upper and lower cover means for said circuit; and a plurality of elongated means which extend radially from equally spaced anchorage points provided on said belt which are driven by it around the elongated circuit; said impelling mechanism being oriented and arranged in such a manner that the elongated means pass on their path along substantially the entire rear portion of the passsage and overlap an associated cutter disk;

first drive mechanism for the cutter disks, which is located within the hollow transverse beam and formed by a plurality of sealed boxes, one for each cutting station, and a shaft which connects them all together and moves them synchronously;

second drive mechanism for the first plurality of each plant-impelling mechanism, located independently of the first within the hollow transverse beam and formed by a plurality of sealed boxes, one for each plant-impelling mechanism, and a shaft which connects them all together and moves them synchronously, independently of the other shaft;

first transmission means which functionally couples the first drive mechanism with a first power take-off of the harvester which has an output with constant torque; a speed multiplying means being provided on said first transmission means to increase the number of revolutions delivered to the first drive mechanism as compared with those received at the take-off;

second transmission means which functionally couples the second drive mechanism and a second power take-off of the harvester, which has an output with adjustable torque, so that the speed delivered to the second drive mechanism is a function of the speed of advance of the harvester; and conveyor means formed by a continuous belt which extends along the entire width of the implement from below the cover of the transverse beam, in the immediate vicinity of which there is arranged a first idle roller, up to the immediate vicinity of a collecting means borne by the harvester in front of the latter, but towards the rear part of the implement where a second driven roller is located; there being provided a plurality of push elements radially projecting from said belt, and the second roller being functionally coupled to the second transmission means so that the speed of the conveyor is directly related to the speed of translation of the elongated impeller means.

* * * * *